United States Patent
Larsen

(10) Patent No.: US 7,139,647 B2
(45) Date of Patent: Nov. 21, 2006

(54) METHODS AND SYSTEMS FOR NAVIGATING UNDER WATER

(76) Inventor: Mikael Bliksted Larsen, 27 Forestdale, London N14 7DY (GB)

( * ) Notice: Subject to any disclaimer, the term of this patent is extended or adjusted under 35 U.S.C. 154(b) by 224 days.

(21) Appl. No.: 10/712,354

(22) Filed: Nov. 14, 2003

(65) Prior Publication Data

US 2006/0235583 A1 Oct. 19, 2006

Related U.S. Application Data

(63) Continuation of application No. 10/232,322, filed on Sep. 3, 2002, now abandoned.

(30) Foreign Application Priority Data

Mar. 3, 2000 (DK) ................................ 2000 00351

(51) Int. Cl.
*G01S 5/18* (2006.01)
*G01S 15/06* (2006.01)
*G01C 21/00* (2006.01)

(52) U.S. Cl. .................. 701/21; 701/216; 701/217; 342/357.14

(58) Field of Classification Search ................ 701/21, 701/207, 213, 214, 216, 217; 367/130, 131, 367/124; 342/41, 126, 357.01, 357.13, 357.14, 342/450
See application file for complete search history.

(56) References Cited

U.S. PATENT DOCUMENTS

| | | | |
|---|---|---|---|
| 4,070,671 A * | 1/1978 | Morrow | 367/6 |
| 4,229,809 A * | 10/1980 | Schwalbe | 367/6 |
| 4,315,326 A * | 2/1982 | Chase, Jr. | 367/134 |
| 4,559,621 A | 12/1985 | Delignieres | |
| 5,119,341 A | 6/1992 | Youngberg | |
| 5,357,437 A * | 10/1994 | Polvani | 701/207 |
| 5,579,285 A | 11/1996 | Hubert | |
| 6,163,503 A * | 12/2000 | Gudbjornsson | 367/6 |
| 6,532,192 B1 | 3/2003 | Reid | |

OTHER PUBLICATIONS

Hassab, et al., "Positioning and Navigation Under the Sea: an Acoutis Method", IEEE, Aug. 1974, pp. 145-149.
Babb, "navigation of Unmanned Underwater Vehicles for Scientific Surveys", IEEE Jun. 1990, pp. 194-198.
Rendas, et al. "Hybrid Navigation System for Long Range Operation", IEEE Jul. 1994, pp. 353-359.
Scherbatyuk, et al., "Integrated Positioning System For Underwater Autonomous Vehicle", IEEE Sep. 1994, pp. 384-388.

(Continued)

*Primary Examiner*—Tan Q. Nguyen
(74) *Attorney, Agent, or Firm*—Sughrue Mion, PLLC

(57) ABSTRACT

In a method for determining absolute position under water of a submersible vessel (1) having a dead reckoning navigation system and receiving acoustic signals from a reference station (19), signals are received from one reference station in several positions (15–18) of the vessel. Estimated absolute positions of the vessel are calculated using range data and relative position data. Range rate data derived from the signals are preferably utilised. In a method for scanning an underwater survey area, the absolute position of a vessel (1) is intermittently being determined according to said method. The reference station may be placed at a fixed absolute position (19), or on the surface of the water, preferably in a buoy or a vessel. A system for determining the absolute position under water of a vessel comprises: acoustic communication means in a reference station and on board the vessel; a dead reckoning navigation system on board the vessel; and computing means.

65 Claims, 5 Drawing Sheets

OTHER PUBLICATIONS

Deveau, "Modern Computing Technology Applied to Underwater Acoustic Positioning Systems," IEEE Oct. 1995, pp. 16-174.

Vagany, et al., "Outlier Rejection for Autonomous Acoustic Navigation," IEEE 2000, pp. 1043-1050.

Larsen, "Synthetic Long Baseline Navigation of Underwater Vehicles," IEEE 2000, pp. 2043-2050.

Sherbatyuk, "The AUV Positioning Using Ranges from one Transponder LBL", IEEE Oct. 1995, pp. 1620-1623.

Yun, et al., An Integrated GPS/INS Navigation System for Small AUVs Using an Asynchronous Kalman Filter, IEEE Aug. 1998, pp. 43-49.

Sollier, et al., "Wideband Underwater Acoustics Transmissions Application to Unmanned Underwater Vehicles Positioning and Control," UDT Pacific 98, Feb. 24-26, 1998—Sydney Convention Centre Australia, pp. 245-249.

* cited by examiner

METHODS AND SYSTEMS FOR NAVIGATING UNDER WATER

This is a continuation of application Ser. No. 10/232,322 filed Sep. 3, 2002 now abandoned; the disclosure of which is incorporated herein by reference.

The invention relates to a method and a system for determining the absolute position under water of a submersible vessel, such as e.g. an unmanned, autonomously operating submarine, as well as a method for scanning an underwater survey area.

The submersible vessel is of the kind having a dead reckoning navigation system not receiving position information from outside the vessel, and the vessel collects data by means of acoustic signals from a reference station having a known absolute position and calculates its distance from the reference station by computing means, preferably an on-board computer.

Several methods and systems are known for unambiguously determining the position of a vessel or vehicle on the surface of the earth or surface of the sea. As examples, generally known satellite navigation (GPS; NAVSTAR; GLONASS), and the previously known DECCA and LORAN systems can be mentioned.

Such systems are almost universally based on short wave radio signals and are thus not usable under water due to the very poor propagation of such radio signals through water, especially sea water.

Systems are known for communicating and/or navigating under water by means of very long wave radio signals, but such systems do not offer features needed for precise commercial navigation, such as availability, resolution and precision.

A principle and a system for acoustic underwater navigation over limited distances is known as "Long Base Line Navigation" (below designated as "LBL"); cf. e.g. Jerome Vaganay et al.: "Outlier Rejection for Autonomous Acoustic Navigation", Proc. IEEE Int'l. Conf. Robotics and Automation, Minneapolis (US) April 1996; or, for a more exhaustive discussion P. H. Milne: "Underwater Acoustic Positioning Systems", Gulf Publishing Company, Houston (US) 1983, ISBN 0-87201-012-0.

Using LBL, a number of reference points are established by placing e.g. transponders on the sea floor in a net or array. Such transponders are adapted to each transmitting an individual acoustic signal when they receive a common acoustic signal.

It is known as well to use for this purpose e.g. acoustic beacons, which simply transmit acoustic signals in an autonomous mode.

When a submersed vessel is to determine its position relative to such a net of transponders, the vessel transmits an acoustic interrogation signal on a common frequency. Upon receival of the interrogation signal, each transponder transmits a response signal on its own individual frequency, after a predetermined, individual delay. The response signals are picked up by hydrophones in the vessel, and a system on board analyses the time delays of the returning response signals and calculates the distance to each transponder; based hereupon, the position of the vessel relative to the positions of the transponders can be determined unambiguously, provided certain conditions as to the number and location of the transponders are met.

The position of each transponder may e.g. be determined as described in Milne, paragraph 5.2, p. 55 et seg. Often, a unit with similar acoustic equipment as the submersible vessel is suspended from a surface vessel having absolute position determining means such as GPS navigation.

The surface vessel is positioned in different positions, determined by means of the navigation system. From each of these positions, the unit exchanges signals with the transponders, as explained. Based upon sufficiently many sets of time delay registrations from these different known positions, the locations of each transponder may now be calculated with satisfactory precision.

In some known LBL systems, the transponders are able to determine the distance between each other. This eliminates the need for determining the position of every transponder from the surface; when the positions of a few transponders with sufficient spacing are known, the positions of the rest of the transponders may be determined by simple triangulation.

It is a disadvantage of LBL navigation that placing and calibrating many transponders is necessary, the transponders often being quite expensive and not always being recovered successfully after a mission. A minimum of three transponders is necessary in order to be able to determine any one position, cf. Milne chapter 5, in particular section 5.2.

In the conference paper A. Ph. Scherbatjuk: "The AUV Positioning using Ranges from One Transponder LBL", OCEANS '95, MTS/IEEE Proceedings of 'Challenges of Our Changing Global Environment', 1995, ISBN 0933957149, vol. 3, pp. 1620–1623, disclosure is made of navigating an underwater vehicle using range data from only one LBL type transponder.

In this paper, serious restrictions are however placed on the usable areas of survey and trajectories of the underwater vehicle. It is thus a precondition for use of the method disclosed that the vehicle operates at constant depth, and follows trajectories shaped as regular meanders, made up entirely of straight lines. It is explicitly stated in the summary of the paper that the "application of the meander like trajectories is not a serious restriction for use of the method . . . ". Thus, the author admits that his method will only work if these restrictions are being complied with.

Of course, the method disclosed in this paper will not be of general use, contrary to the author's assertion, since most underwater tasks will indeed imply the underwater vehicle following many differently shaped trajectories.

In the conference paper Richard J. Babb: "Navigation of Unmanned Underwater Vehicles for Scientific Surveys", AUV '90, IEEE Proceedings of the Symposium on Autonomous Underwater Vehicle Technology, 1990, pp. 194–198, it is in section 4 suggested to combine LBL with Dead Reckoning (referred to below as "DR"). DR may e.g. comprise use of an acoustic log measuring the speed relative to the sea floor, and/or use of an Inertial Navigation System (refrred to below as "INS").

Hereby is it possible to obtain satisfactory results with fewer transponders than in simple LBL, DR being used when navigating between areas in which response can be had from as many transponders as necessary for determining the position by the LBL method with adequate accuracy.

It is briefly described in section 4 of this paper with reference to FIG. 4 of same paper that "Since the DR system is capable of determining the direction of the course made good over ground to high accuracy (much better than 1 degree) it is possible to obtain an unambiguous fix from a single transponder, by combining the radial distance to the transponder with the true course from the DR system" (a "fix" meaning a determination of absolute position).

The skilled person will know that both of the terms "the direction of the course made good" and "true course" has the same meaning, that is the direction of the vehicle trajectory over ground with respect to true (geographic) north.

The only way combination of "true course" with measurement of range can provide an "unambiguous" fix is by having the vehicle travel in a straight line (as clearly indicated in FIG. 4) while receiving signals from the transponder. At the position where minimum range is recorded (as clearly indicated by the dotted lines in FIG. 4), the transponder is known to be located in a direction orthogonal to the "direction of the course made good" at the measured minimum distance (as indicated by the dotted lines in figure 4).

Since now both direction and range to the transponder is known, an unambiguous fix is indeed provided. However it is a significant drawback of the described method that the vehicle has to follow a linear trajectory past the transponder. In particular, any inability of the vehicle guidanc system to exactly follow a straight line will inroduce additional errors into the position fix.

In general, the method described to obtain an unambiguous fix will provide two solutions for the position of the vessel relative to the transponder, that is, one position to the starboard and one position to the port side of the transponder (seen in the direction of travel of the vessel). Some essential prior knowledge of the position of the transponder and the trajectory of the vessel will therefore be necessary in order to discriminate correctly between such two solutions.

In the paper, the right solution seems to be chosen using prior knowledge of the trajectory of the vessel relative to the absolute position of the transponder. This is a severe disadvantage of the method disclosed in the paper.

In the conference paper A. Ph. Scherbatjuk et al.: "Integrated Positioning System for Underwater Autonomous Vehicle MT-88", OCEANS 94, IEEE Proceedings of Oceans Engineering for Today's Technology and Tomorrow's Preservations, 1994, ISBN 0780320565, vol. 3, pp. III/384–388, a similar integrated positioning system is disclosed.

This system is based upon joint processing on board the underwater vehicle of data from an on-board autonomous navigation system and data from a Long Base Line acoustic positioning system.

The LBL data are provided by use of at least two and preferably three transponders, but it seems not to be explained how large a sea floor area may be surveyed by means of this system.

In the conference paper A. H. Carof: "Acoustic Differential Delay and Doppler Tracking System for Long Range AUV Positioning and Guidance", IEEE Proceedings of the 1994 Symposium on Autonomous Underwater Vehicle Technology, 1994, ISBN 0780318080, pp. 370–375, a system consisting of two dual frequency synchronised reference beacons and a hydrophone is described.

The beacons concurrently transmit signals at individual, fixed and predetermined frequencies. Using the hydrophone, the underwater vehicle measures the differential delay and the differential doppler shift of said signals transmitted from said beacons. Assuming and using prior knowledge of the velocity of the underwater vehicle the position is determined from said measurements.

From U.S. Pat. No. 5,357,437 an underwater navigation system is known where a submersed vessel drops one or more magnetic markers on the sea floor and uses the magnetic field from these markers for determining its current position. The markers may have permanent magnets or electro-magnets fed by alternating current.

Further, the vessel has a DR and/or INS navigation system and will therefore be able to navigate for some time without position signals from the markers.

It is a substantial disadvantage by this known system that the absolute position of the markers is not determined.

Finally, from U.S. Pat. Nos. 5,119,341 and 5,579,285, methods and apparatus are known for extending radio based navigation systems such as the GPS for use under water.

A number of buoys are floating on the surface, and each buoy is continuously recording its position by receival of signals from the radio based navigation system. Each buoy transmits acoustic signals into the water.

In the latter of the two U.S. Pat. No. 5,119,341, the position of a submersed vessel may then be determined relative to the buoys, e.g. by means of a strategy corresponding to the one used in the GPS itself. Data is besides transmitted between the submersed vessel and a land based station through the same acoustic channels and through radio channels via communication satellites.

Apparently, only in the former of the US patents the vessel is in fact determining its position in this way; in the latter patent the position it determined at the surface or the land based station.

U.S. Pat. No. 5,579,285 also mentions a concept for determining the position of the underwater vehicle from using only a single buoy, col. 4, l. 44 et seq. However, the mentioned approach requires the buoy be carried by and released from the underwater vehicle. Also, the buoy has to be pre-programmed with the position at which it is released.

Of course, the underwater vehicle will not "know" where it is, otherwise it would not need to release any buoy to get a position "fix". Hence the position of releasing the buoy will in any case be indefinite. Alternatively, a position estimate has to be programmed into the buoy prior to its release from the underwater vehicle, which requires the vehicle to have this capability.

The buoy also needs to know the direction of the trajectory which the underwater vehicle intends to follow after the release of the buoy. Especially for military applications it may also be a significant disadvantage that the underwater vehicle has to transmit signals, eliminating the possibility of covert operation.

Consequently, this disclosure seem not to provide any usable solution either.

It is an object of the present invention to provide a method and a system for determining absolute position under water, wherein a precise position can be obtained from a minimum number of reference stations, preferably only one reference station.

It is a further object of the invention to eliminate the need for a surface vessel to deploy and calibrate transponders or to generally assist or support the submersible vessel.

It is finally an object of the invention to provide a method for scanning an underwater survey area with substantially reduced needs for deployment of transponders or assistance or support from surface vessels.

In a method for determining the absolute position under water of a submersible vessel having a dead reckoning navigation system not receiving position information from outside the vessel, where the vessel receives acoustic signals from a reference station having a known absolute position and calculates its range from the reference station, said objects are met in that signals are received from one reference station in several positions of the vessel, and that estimated absolute positions of the vessel are calculated using range data based on the received signals and using relative position data from the dead reckoning navigation system.

By receiving and processing said signals in several positions of the vessel, a corresponding multiple-dimensional measurement and/or redundance is being had as when receiving signals in one position from several reference stations.

Preferably, signals are received and data processed at short intervals of time, providing for a substantially continuous estimation of absolute position data. Hereby, a determining and updating of position is achieved, far superior to the prior art.

Preferably, the position of the reference station in a relative coordinate frame of said dead reckoning navigation system is estimated. This provides for an advantageous mathematical modelling of the absolute position on board the vessel.

In one embodiment, the estimated absolute position data are preferably used for updating the dead reckoning system's relative position data. The latter data will hereby constitute a continuous source of reliable absolute position information.

It is generally preferred that estimates are made of parameters intrinsic to the nature of the dead reckoning navigation system, such as sea currents, and relative position data from the dead reckoning navigation system are compensated by the estimate of said parameters.

In this way, the impairing influence from such parameters will be minimised in an efficient way.

Preferably, a least-squares algorithm is used in determining the values of the estimates. This algorithm has proven to be superior in supplying fast and reliable estimates.

According to a preferred embodiment of the invention, data for rate of change of the vessel's range from the reference station are derived from received signals together with range data.

Hereby, the requirements to the number and/or quality of the measurements are vastly reduced, providing for increased accuracy and reliability of the method of the invention.

Said "Range Rate" data are preferably derived from recordings of doppler shifts of frequencies of the acoustic signals from the reference station, or alternatively from recordings of spread spectrum pulses in the acoustic signals from the reference station. Both methods have shown to provide reliable and efficient range rate data.

It is generally preferred to estimate the position of the reference station in a relative coordinate frame of said dead reckoning navigation system from processing of data comprising range rate data as well as range data. As stated earlier, this provides for an advantageous mathematical modelling of the absolute position on board the vessel.

Preferably, said estimates are made further utilising information on the depth of the reference station. Hereby, an advantageous redundancy is introduced into the position estimating data.

In a method for scanning an underwater survey area by means of a submersible vessel travelling a desired path, the vessel having a dead reckoning navigation system not receiving position information from outside the vessel, where the vessel receives acoustic signals from a reference station having a known absolute position and calculates its range from the reference station, the objects mentioned earlier are met in that the absolute position of the vessel is intermittently being determined according to the method of the invention.

Hereby, an underwater area may be surveyed using only a single reference station, or at least a vastly reduced number of reference stations, relative to the prior art.

Preferably, if said area extends beyond the operational reach of the reference station, the intended trajectory of the vessel is arranged to bring the vessel within said operational reach at regular intervals of time.

Hereby, the ability of the DR system to navigate with a satisfying precision for a limited period of time is utilised in an optimal way, while at the same time a satisfying precision is maintained for the duration of the entire mission.

It is preferred that the intended trajectory of the vessel is arranged to bring the vessel within a minimum distance of every point in the area, in order to ensure a complete coverage of the area with a minimum of effort and expense.

In preferred embodiments of the methods of the invention, the reference station is placed at a fixed absolute position.

This provides for a simple and effective configuration and minimal costs.

In an especially preferred embodiment of the invention, the absolute position of the reference station is determined by the submersible vessel at the surface of the water collecting absolute position data in a number of positions from a positioning system usable at the surface of the water, and while surfaced receiving acoustic signals from the reference station, and calculating range data from said signals, position and range data preferably being processed on board the vehicle.

Further, in this embodiment the reference station is preferably launched from the submersible vessel, and especially preferred as well collected by the submersible vessel after estimating the absolute position.

In these very important embodiments, the need for a surface vessel is reduced, and may in fact often dispensed with. Hereby costs for an underwater survey mission may be further minimised in a very efficient way. The reference station may preferably comprise an acoustic transponder, or alternatively an acoustic beacon.

These features, known per se, will provide efficient signal sources for various types of mission.

In another preferred embodiment, the reference station is placed on the surface of the water, preferably in a buoy or a vessel.

According to the invention, this will provide for the very important possibility of giving the reference station direct access to reliable absolute position data via e.g. the GPS.

Preferably, such data are relayed to the submersed vessel, providing for immediate updating of the DR system's absolute position estimate.

Further in this embodiment, it is preferred that the reference station exchanges communication data with a communication system usable at the surface of the water, and exchanges such data with the submersible vessel.

Hereby an efficient channel of communication to and from the vessel may be established in a particularly simple and advantageous way.

In a certain embodiment of the invention, the reference station is placed in a submersible vessel being surfaced during use of the reference station.

This provides for, say, a pair of submersible vessels operating autonomously, or subject to remote control, in an underwater mission for very extended periods of time.

In a system for determining the absolute position under water of a submersible vessel, the system comprising:

a reference station having acoustic communication means;

acoustic communication means on board the vessel;

a dead reckoning navigation system on board the vessel;

the objects mentioned are met in the system further comprising computing means, preferably on board the vessel for estimating absolute position data from consecutive receivals of signals from one and the same reference station.

These features will enable the system to operate according to the methods of the invention.

The dead reckoning system is preferably an Inertial Navigation System, and/or preferably comprising:

a number of Ring Laser Gyros;

a number of solid-state accelerometers;

a Doppler Ground Velocity Log;

a direct or indirect speed of sound measurement sensor; and a pressure sensor.

These features provide for reliable autonomous navigation of the underwater vehicle for comparatively long periods of time without having the DR system updated.

In a preferred embodiment of the system, the submersible vessel is adapted to carry a number of reference stations and to launch the stations independently.

It is further preferred that the submersible vessel is adapted to collect a number of reference stations.

These very important features further provide for dispensing with the need for an assisting surface vessel, as has been explained above.

In the system, the reference stations are preferably acoustic transponders or beacons, resting on the sea floor or suspended above an anchor resting at the sea floor, or alternatively being located on buoys or vessels floating at the surface of the water.

By these measures, advantages are obtained corresponding to those explained above with reference to the methods of the invention.

The invention will be explained in more detail below, by means of embodiment examples and with reference to the drawing, in which same reference designations indicate similar objects in all figures, and in which.

Figure 1:
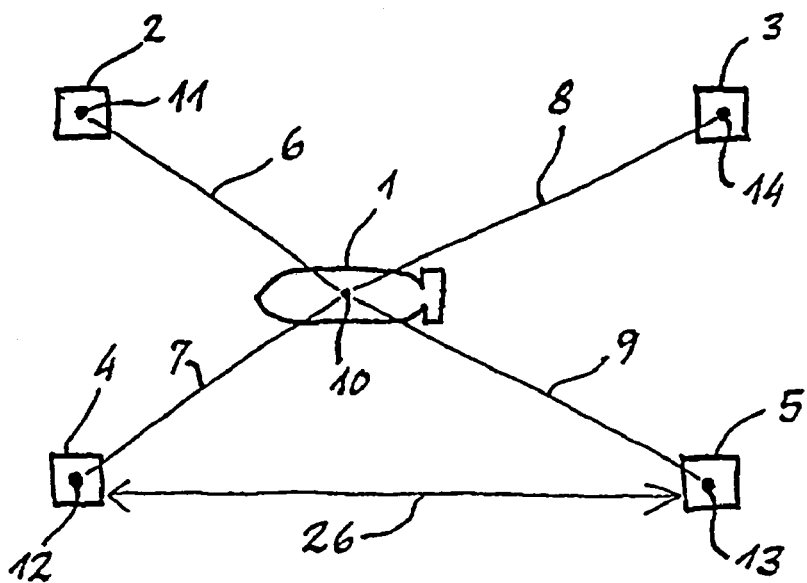
FIG. 1 shows determining of the absolute position of a submersible vessel by means of an LBL navigating system of the prior art, in schematic top view.

FIG. 1 illustrates the basic principles of working of a generally known LBL navigating system. FIG. 1 is a top view of an area of the sea floor. A submersed vessel 1 is navigating near the sea floor. On the floor, or suspended above it, four transponders 2–5 are placed.

The transponders are of any type known per se for use in LBL systems; they are each equipped with a hydrophone and a speaker, the positionings of which are indicated by reference numerals 11–14.

Each of the transponders 2–5 are adapted to transmit an acoustic response signal via the speaker upon receival of an acoustic interrogation signal via the hydrophone. Preferably, the response signal is delayed by a predetermined time delay unique to each transponder, relative to the receival of the interrogation signal, and the response signal is transmitted on a frequency unique to each transponder.

Thus, when a unit is transmitting an interrogation signal, it will receive response signals from the transponders with different delays and on different frequencies.

By determining the time delay from transmittal of the interrogation signal to receival of a response signal on the frequency of one particular transponder, the distance or "range" from the unit to this transponder may then be calculated when the sound velocity in the water and the time delay of the transponder are known.

The absolute positions of the transponders are determined beforehand, preferably by triangulation from a surface vessel establishing its own positions from e.g. a satellite navigation system such as the GPS.

The submersible vessel 1 is likewise equipped with a hydrophone and a speaker, the positioning of which is indicated by reference numeral 10.

In order to determine its position when needed, the submersed vessel now transmits an interrogation signal from its speaker 10, the signal being received by the hydrophones 11–14 of the transponders 2–5. The transponders transmit response signals as mentioned from their speakers 11–14, and these signals are received by the hydrophone 10 of the vessel 1.

Now, the four individual delays are determined and processed in a system inside the vessel 1, and the distances 6–9 to each of the transponders are calculated as mentioned. Hereby, the position of the vessel 1 relative to the transponders 2–5—and thus the vessel's absolute position—may be calculated. This is preferably done on board the vessel, which then will be able to utilise the calculated absolute position when navigating.

Transponders of the type utilised may be equipped with sensors such as pressure, temperature and salinity sensors for determining speed of sound and depth of the transponder. This information may then be relayed to the interrogator via telemetry and used for aiding use of the transponder.

Further, transponders are known which are able to determine the distance between each other, thus aiding in determining their absolute positions.

It is a precondition for reliable and reproducible determining of the position, however, that the "Baseline" i.e. the distance 26 between any two transponders is sufficiently long compared to the measured distances 6–9; hence the designation Long Base Line (LBL). In other words, acute angles should be avoided between lines from the vessel to any two transponders.

Figure 2:
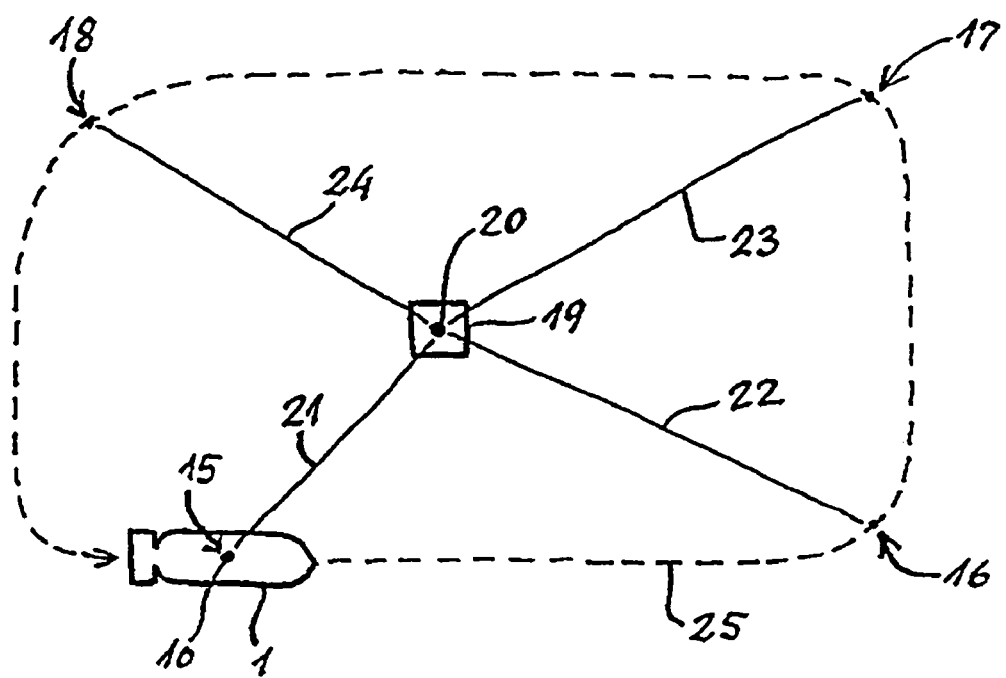
FIG. 2 shows determining of the absolute trajectory and absolute positions of a submersible vessel by means of the method according to the invention, in schematic top view.

In FIG. 2, one embodiment of the method according to the invention is illustrated, in the same view as in FIG. 1. A submersed vessel 1 is navigating near the sea floor; on the floor, or suspended above it, one transponder 19 is placed. The vessel 1 is to follow a desired trajectory 25.

According to the invention, the vessel 1 is equipped with a Dead Reckoning (DR) navigation system, enabling the vessel to navigate with a desired accuracy for shorter periods of time without updating its absolute position. Such a navigation system is known per se and will typically comprise a compass, a log and a depth indicator. In high-grade systems of this kind, an Inertial Navigation System (INS) will be included as well.

In the present embodiment, the DR navigation system is preferably of very high grade, enabling the submersed vessel 1 to navigate for rather long periods of time with only small deviations from the absolute position. State of the Art in this respect will enable the DR navigation system to estimate the absolute position of the submersed vessel with a maximum deviation of 3 m over a period of time of 1 hr; or about 0.03% to 0.1% of the distance made, depending on the regularity of the trajectory.

A preferred DR navigation system for the described use will preferably comprise the following systems: a so-called "Strap-Down" Inertial Navigation System (INS) (i.e. an INS where the inertial sensors are attached rigidly ("strapped down") to the body of the vehicle, e.g. based on Ring Laser Gyros and solid-state accelerometers), a Doppler Ground Velocity Log (DVL) or Correlation Velocity Log, a CTD sensor (Conductivity, Temperature and Depth) or a direct speed of sound measurement sensor, and a pressure sensor. Such a system is able to determine the absolute heading by "alignment", by sensing the gravity and earth rotation vectors and measure absolute velocity by means of the log.

A suitable INS is the type KN-5053 from Kearfott G & N Corporation of America, New Jersey, USA.

In the embodiment example in FIG. 2, the submersed vessel 1 follows the trajectory 25 crossing through the points 15–16. The vessel 1 interrogates the transponder 19 in each of these points, and from the response signals of the transponder, the distances (ranges) 21–24 are calculated.

The vessel's 1 DR navigation system will be able to navigate accurately through the whole of the path 15-16-17-18-15 relative to the starting point 15, if the path be concluded in a sufficiently short time. Assuming this, the mathematical problem of determining the absolute positions 15–18 in the path 25 relative to the known position of the transponder 19 reduces to a problem of the same kind and complexity as the problem in FIG. 1 of determining the position of the vessel 1 relative to the known positions of the transponders 2–5.

The same geometrical requirements apply for the location of the points 15–18 as for the transponders 2–5 in FIG. 1, i.e. the baselines should be long and acute angles should be avoided in order to achieve optimum accuracy.

In practice, the position of the transponder 19 will preferably be determined in a relative coordinate system of the vessel's 1 DR navigation system. The offset of the DR navigation system is easily calculated as the difference between the known absolute position of the transponder and the determined relative position of the transponder, and hence the absolute position of the path 25 is determined.

It is generally preferred that estimates of the position of the vessel 1 relative to the single transponder 19 are derived by means of the position output by the DR navigation system and the distance measurements. Furthermore, parameters intrinsic to the nature of the DR navigation system, such as e.g. the sea current, may be estimated as part of the process. Each measurement of distance is related to the position output by the DR navigation system compensated by the estimate of parameters intrinsic to the DR navigation system, and an estimate of the position of the transponder in the relative coordinate frame of the DR navigation system is made.

Preferably, a least-squares algorithm (cf. e.g. Lennart Ljung: "System Identification, Theory for the User", Prentice-Hall, 1987, ISBN 0-13-881640-9) is used to determine values of the parameters intrinsic to the DR navigation system and a position of the transponder in the relative coordinate frame of the DR navigation system that best fit the set of relations obtained from the distance measurements, with respect to minimising of squares. A recursive method such as e.g. the Kalman filter known per se may also be used to implement the triangulation calculations.

The offset of the DR navigation system is now calculated as the difference between the known absolute position of the transponder, and the determined position in the relative coordinate frame of the DR navigation system.

In general, a minimum of three or four range measurements will provide an unambiguous solution, subject to whether or not the depth of the transponder is known a priori (the depth of the vehicle may be measured directly by pressure sensing, as mentioned). A few more ranges will be required if the DR system's log only measures displacement relative to the body of water. In general, extra ranges would be measured as well in order to add redundancy in case of spurious measurements, and to improve accuracy.

It is an important advantage of the method according to the invention that the vehicle is not required to follow any specific path. It is also an advantage of the method that the position of the vehicle relative to the transponder is determined without requiring knowledge of the absolute position of the transponder.

Regarding the LBL systems of the prior art, it is well known that in order to achieve optimum accuracy, the baselines between each transponder must be long and acute angles be avoided. The present invention however, holds a very significant advantage over LBL systems in that it is possible to make range measurements to the one transponder from any number of positions, i.e. a much higher number than the number of transponders in a LBL system. The LBL equivalent of this would be deploying a correspondingly large number of transponders, which is both very impractical and very expensive.

If the DR system is not able to compensate for sea currents, i.e. if only speed through water is measured, the sea current may also be estimated from the range measurements and hence be compensated for. In this case, however, the number of measurements will have to be increased in order to obtain the same accuracy.

It is seen from the above that prerequisites for the accurate navigation in FIG. 2 are i.a.: 1) a DR navigation system on board the vessel 1; 2) that the vessel has to travel a trajectory of certain length and dimensions before knowing its updated absolute position; whereas 3) in return, only one transponder 19 with a known absolute position is needed.

In addition to reliable position fixes in the points 15–18, the method of the present invention provides accurate position information along the entire path 15-16-17-18-15, and for some time following the last fix as well, subject to the quality of the DR navigation system. It is not possible to fully compensate a heading error of the DR navigation system using only range measurements from one fixed source. Thus, DR navigation system of considerably higher quality than those commonly used in LBL systems will be preferred for use with the system of the invention.

As the costs for such an "extra high quality" DR navigation system is an initial investment, whereas the need for several transponders in an LBL system entails considerable operational expenditures as compared to only one transponder, the method of the present invention will allow very considerable savings as compared to the known LBL navigation system.

In particular, the rather heavy costs for a surface vessel normally needed to deploy, calibrate and recover the many transponders needed in the known LBL system (typically around US $30,000/day) may be cut to a minimum, or entirely dispensed with as will be explained below.

Figure 3:
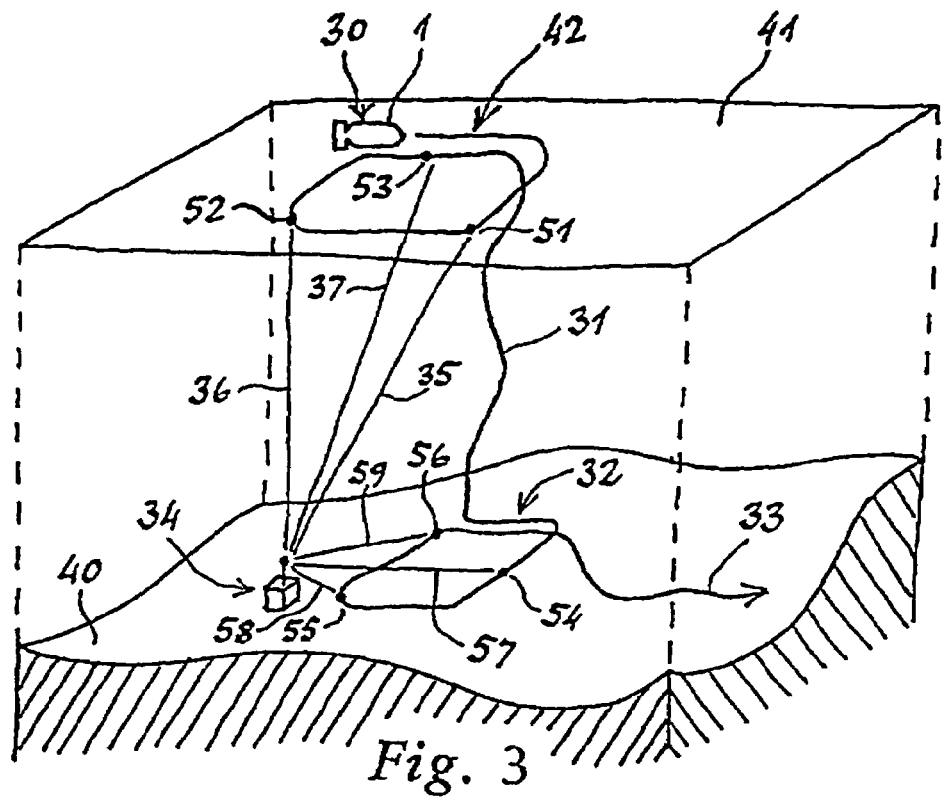
FIG. 3 shows an unmanned submersible vessel determining the absolute position of a transponder placed on the sea floor, and afterwards determining its own position relative to the transponder when submersed near the sea floor, in schematic perspective view.

In FIG. 3, another embodiment example of the method of the invention is illustrated. An unmanned underwater vehicle 1 has been launched on the surface 41 of the sea, a lake or a river, and a transponder 34 has been dropped on the floor 40 of the same body of water.

The vehicle 1 has aerial means 30 and a suitable receiver for receiving absolute position radio signals from a positioning system such as GPS. In order to determine the absolute position of the transponder 34, the vehicle 1 travels through a path 42 comprising a number of positions 51–53 and in each position measures the range 35–37 to the transponder by means of acoustic signals. The absolute position of the vessel 1 according to the radio based positioning system is recorded for each of the positions 51–53.

For reasons of clarity in the drawing, only three such positions 51–53 with corresponding ranges 35–37 are shown. Even if a minimum of three positions will be necessary to determine the exact position of the transponder, a higher number will be preferred in any case.

The position of the transponder in three dimensions is now determined by triangulation, using the lines interconnecting the positions 51–53 as baselines together with the range measurements. In order to provide some redundancy to the measurements, the transponder may be provided with a depth indicator, giving an a priori depth information.

Also, the transponder may be equipped with additional sensors for estimating the speed of sound to be used in converting the time delay into a measurement of range.

The vehicle 1 then submerges (31) to near the sea floor 40 and travels through a path 32 comprising a number of positions 54–56. In each of these positions, measurements are made of the range 57–59 from the vehicle to the transponder, in a similar way as explained above with reference to FIG. 2.

As the absolute position of the transponder 34 has been determined, the absolute positions 54–56 may now be calculated, and the vehicle's 1 DR navigation system be updated accordingly. The underwater vehicle 1 may now continue on its desired path 33, being able to continuously record its estimated absolute position according to data from its DR navigation system.

With the DR navigation system thus updated, the position continuously given: by this system is known to be correct within a certain error which is increasing with time in a predictable manner, subject to the intrinsic qualities of the DR navigation system.

Future updatings of the DR system will be made as necessary incorporating exchange of acoustic signals with the transponder 34, as explained above with reference to FIG. 2.

Figure 4:
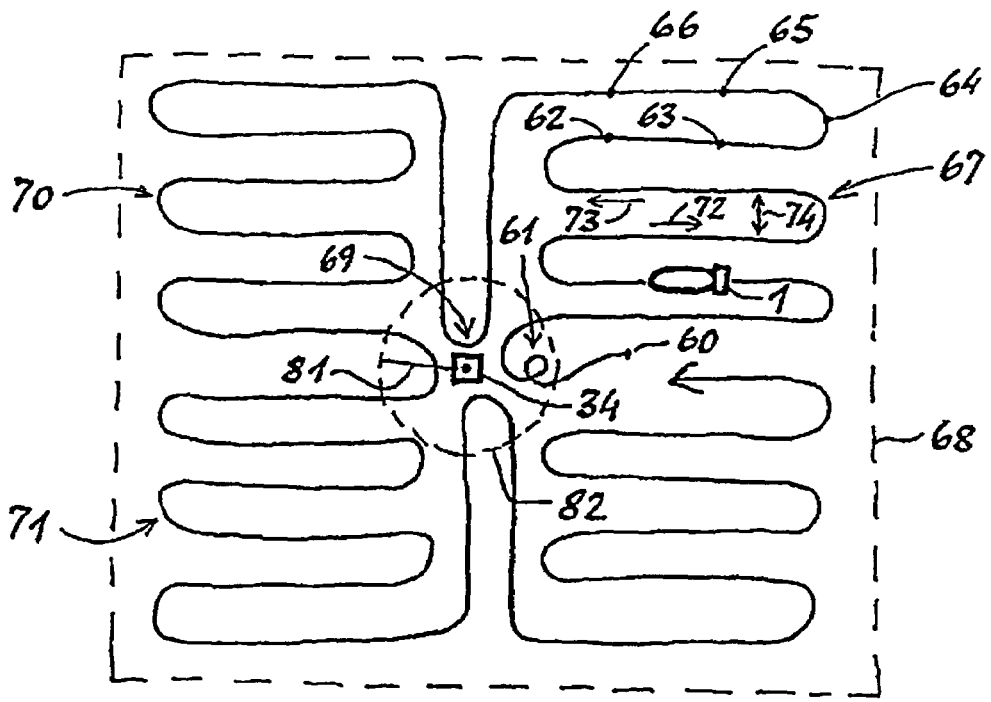
FIG. 4 shows a path to be followed by a submersible vessel scanning an underwater survey area, in schematic top view.

In FIG. 4 is illustrated how an area extending far beyond the acoustic range of one transponder may according to the invention be surveyed.

According to the invention, the trajectory of the submersible vessel is arranged in such a way that the vessel will return to within the range of the transponder at regular intervals. Thus, the DR system may be reset as soon as response signals from the transponder can be had and analysed. As long as this objective is met, the trajectory may be arranged in any way convenient for the application in question.

It is a characteristic known per se of most DR navigation systems that navigation in a confined area will cause some of the inherent error sources to cancel out, improving DR performance in terms of position error relative to distance travelled. It is easily seen that the position error arising from e.g. a fixed heading angle error in the DR system will be cancelled if the vehicle travels along a straight line for a certain distance and then returns along the same line to its starting point. In fact, this will apply regardless of the trajectory made. It can be demonstrated that similar conditions apply to several other forms of error build-up in DR navigation systems.

In FIG. 4, an arrangement example of a suitable trajectory for scanning an underwater survey area 68 is illustrated, which utilises the characteristics mentioned.

An underwater vehicle 1 will start at the position 60, and initially follow a path 61 such as a closed loop, updating its DR navigation system as described above against the known absolute position of the transponder 34 situated at or above the sea floor. The acoustic reach or range 81 of the transponder is quite limited as compared to the extension of the survey area 68, and is illustrated by a circle 82 having a radius 81 equal to said range.

With its DR navigation system thus updated, the vessel proceeds surveying along a path 67 leading from the transponder, and proceeding in directions 72 and back again in opposite directions 73. The opposite direction portions 72, 73 of the path 67 are preferably offset from each other by a distance 74 in order to scan the survey area 68 as regularly as possible. Along the path 67, the vehicle will collect desired samples or data, according to the purpose of the mission in question, e.g. at positions 62–66.

According to the invention, the trajectory 67 is so arranged that it leads back into relative vicinity of the transponder 34, e.g. at 69. Here, the underwater vehicle 1 will exchange signals with the transponder 34, collecting range data for determining its absolute position, as explained with reference to FIG. 2. This is done while the vehicle follows a suitable path 69, which may be a closed loop, or e.g. a curve with a suitable radius as indicated in FIG. 4, bringing the vehicle to the proper course for following the next path 70.

As is seen from FIG. 4, the survey area is in the embodiment illustrated being scann d in consecutive quadrants of the survey area, the vehicle 1 following paths 67, 70, 71, etc., as indicated in FIG. 4.

It is an important advantage of this scanning method that the vessel 1 is brought back into relative vicinity of the transponder 34, so that position error build-up in the DR system can be cancelled by updating the DR system with the known absolute position of the transponder 34.

It is an intrinsic advantage of this scanning method that the position errors arising in the vehicle's DR navigating system tend to balance out as the vehicle after following one path 72 turns around and travels back following an opposite course path 73, returning to the vicinity of its starting point. Thus, the relative position error of closely spaced points on lines in opposite directions will be small.

It must be noted as a specific advantage that the path 67 may reach far beyond the distance 81 at which acoustic signal contact may be had between the vessel 1 and the transponder 34.

The fundamental accuracy of the system is limited by the fact that a fixed heading error is not observable from range measurements to a fixed source. Thus, the expected maximum position error is as a minimum the heading error in radians multiplied by the distance to the transponder. Thus, a heading error of e.g. 0.5 milliradians and a maximum distance of 5 km will equal a position error of 2–5 m.

The quadrants 70, 71, etc. are scanned in a way similar to the scanning described of the first quadrant 67. Between the scanning of two consecutive quadrants 67, 70, it is ensured that the vehicle 1 travels a suitable path 69 within the range 81 of the transponder 34, allowing a proper position fix to be had, and the DR system of the vessel 1 to be updated accordingly.

A person skilled in the art will be able to devise suitable trajectories following the principles explained above, for the purpose of surveying areas that do not have a square or rectangular configuration, or where certain specific conditions will have to be considered.

Experiments have revealed that an area of 10×10 km (100 km$^2$) can be surveyed to an accuracy of less than 4 m with the use of only one transponder in combination with a DR system such as the make Kearfott G & N, type KN5053 "SeaNav" doppler-inertial Navigation System.

This survey may be made with very considerable economical savings indeed as compared to the known LBL system incorporating a large number of transponders.

Figure 5:
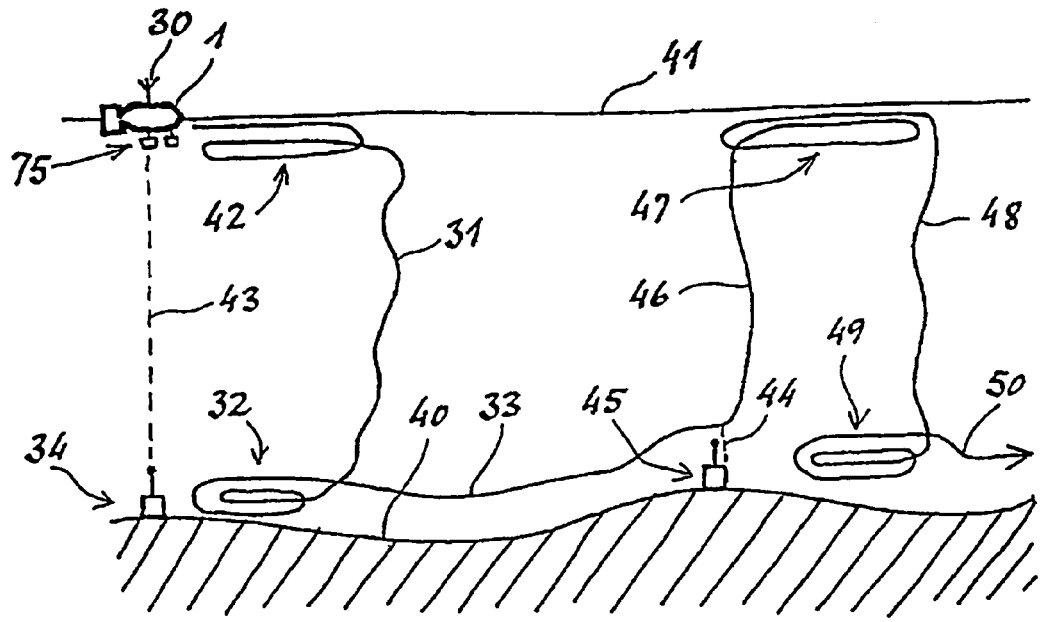
FIG. 5 shows the same procedure as in FIG. 3, where the submersible vessel itself drops a transponder and calibrates it as the need for absolute position determining arises, in schematic side view.

In FIG. 5, a particularly advantageous embodiment of the method in FIG. 3 is illustrated. This embodiment is superior i.a. in very elongate survey areas, such as when performing a "Line Survey" i.e. surveying a quite narrow strip of the sea floor where e.g. a cable or a pipe line is to be submerged.

In such a survey, a submersible vessel performing the survey will typically travel along the siting only once, recording characteristics of e.g. the sea floor.

As the vessel will thus never return or indeed travel back, the method in FIG. 4 will not be of any use. Instead, the embodiment shown in FIG. 5 of the method according to the invention can be used.

The submersible vessel 1 carries a number of transponders 75 which can be dropped at command from the vessel's control system or at command from e.g. a manned control centre. One transponder 34 is dropped (43) before the vessel descends (31) to the operating depth, and the position of the transponder is calibrated by the vessel 1 travelling a path 42 while receiving position information such as GPS via an aerial 30, as explained above with reference to FIG. 3.

Descended to its operating depth, the vessel travels a path 32 and determines its absolute position as explained above with reference to FIGS. 2–3. The DR navigation system of the vessel 1 now being updated, the vessel sets out on its mission, travelling a desired path 33.

After a certain distance has been covered or a certain time has lapsed, the predictable error in the absolute position as estimated by the vessel's DR navigation system has reached a predetermined maximum level, and a new position fix will be necessary for updating the PR system.

Then, the submersible vessel 1 drops (44) one 45 of the carried transponders 75. The position at which the DR navigation system believes the transponder was dropped (the "relative position" of the transponder), is recorded or alternatively, if this does not provide sufficient accuracy, the "relative" position of the transponder is determined by the vehicle travelling a path as described above and recording range measurements.

The submersible vessel ascends (46) to the surface 41 and determines the absolute position of the dropped transponder 45 by travelling a path 47, receiving position signals and making range measurements, in the same way as described above with reference to the initially dropped transponder 34.

The vessel 1 then descends (48), determines its absolute position by travelling a path 49, exchanging signals with the dropped transponder 45, and then continues its mission (50).

The absolute position of the transponder now being known allows for determining the position error prior to surfacing, by comparing the transponder's relative position at the time (44) of dropping to the transponder's relative position after the recent updating of the DR system, the latter relative position now referring to the absolute positioning system used at the surface.

Since the position error is often an approximate linear function of time and/or distance, it is possible to determine the actual trajectory between the transponders (34, 45) with very high accuracy by post-processing of data. Typically this post-processing scheme will be able to compensate more than 90% of the position error build-up between transponder fixes.

According to the invention, transponders can be carried and dropped in any number necessary for carrying out the mission in question with any desired position accuracy, subject to limitations mostly in the submersible vessel's 1 payload and battery capacity.

To compensate for the change in buoyancy from dropping a transponder the underwater vehicle may be equipped with a variable buoyancy system, known per se. Alternatively, an object having a positive buoyancy may be released together with each transponder.

The embodiment in FIG. 5 of an underwater survey has a very distinct advantage in that it can be performed without use of a surface vessel at all. The submersible vessel 1 may be launched by means of a helicopter, the vessel carrying the required number of transponders at launch. When the mission is finished, the vessel is recovered by helicopter as well after surfacing. The costs for such two helicopter missions are much lower than for a survey ship mission, primarily owing to the much shorter durations of the former.

The transponders may be pre-programmed to surface by dropping a weight after a predetermined time or at a suitable command. According to one preferred embodiment of the invention, it is however preferred to let the vessel 1 collect the transponder immediately after updating of its DR system; in this way only one transponder may be needed for the whole mission.

In a preferred embodiment of the method according to the invention, the underwater vehicle, in addition to the range, calculates the rate of change of the range (the "Range Rate") from the acoustic response signal sent from the transponder upon interrogation from the vehicle.

In one approach it is utilised that the range rate is proportional to the doppler frequency shift of the response signal and may be calculated from said doppler frequency shift. The Doppler frequency shift is measurable since the frequency of the response signal from the transponder is known à priori.

One alternative approach would be to use spread spectrum signalling techniques, as described in e.g. the conference paper T. C. Austin: "The Application of Spread Spectrum Signalling Techniques to Underwater Acoustic Navigation", AUV '94, IEEE Proceedings of the 1994 Symposium on Autonomous Underwater Vehicle Technology, 1994, pp. 443–449. In that case the response signal of the transponder 34 would include spread spectrum pulses, e.g. with a particular coding such as Barker Code or Gold Codes, pulses being separated by a fixed and known amount of time T e.g. 0.1 s, 1 s or 5 S.

The separation in arrival time Tm of said spread spectrum pulses will be detected by the vehicle's hydrophone and associated spread spectrum detector circuits. The discrepancy dT=Tm−T is then derived and used for calculating the rate of change of distance or "range rate" (RR): RR=dT/T× $v_s$, where $v_s$ is the speed of sound. Other ways of determining the range rate from the acoustic response signal(s) could be devised, and/or will be familiar to the person skilled in the art.

As it will now be explained with reference to FIG. 6, this embodiment of the invention allows for very much improved performance in determining the absolute position under water of the vehicle 1. In principle, reception of only one or two signals from the transponder will suffice in order to obtain a recording of the position in three dimensions of the vehicle relative to the transponder.

In particular the underwater vehicle will be able to determine absolute position close to the range limit of the acoustic signals without having to perform an extended trajectory to allow for a long baseline. This is because the range rate provides significant information on the direction to the transponder, which is complemental to and independent of the range information provided by the time delay.

Assuming the vehicle 1 has an absolute log, such as e.g. a Doppler Velocity Log measuring the velocity vector over the sea floor in the direction of the axis of the vehicle, or other means of measuring said velocity vector, and an attitude sensor such as e.g. a magnetic or gyro compass or an INS, the velocity vector V of the vehicle 1 will be known in direction as well as magnitude.

Now, the speed v of the vehicle 1 towards the transponder 34 is equal to minus said determined range rate. Said speed v is also equal to the magnitude of V multiplied by the cosine of the angle α between the velocity vector V and the direction towards the transponder 34, i.e. the "dot product" of V and a unit vector in the direction from the vessel towards the transponder.

Consequently, the transponder 34 will be located on the surface of a cone having its vertex in the vehicle's 1 hydrophone 10 and its axis coinciding with the velocity vector V. This conical surface is schematically illustrated in FIG. 6 by the two lines L, M.

Further, the transponder 34 will be located on the surface of a sphere S having its centre in the hydrophone 10 and a radius r equal to the computed range (distance) to the transponder.

Figure 6:
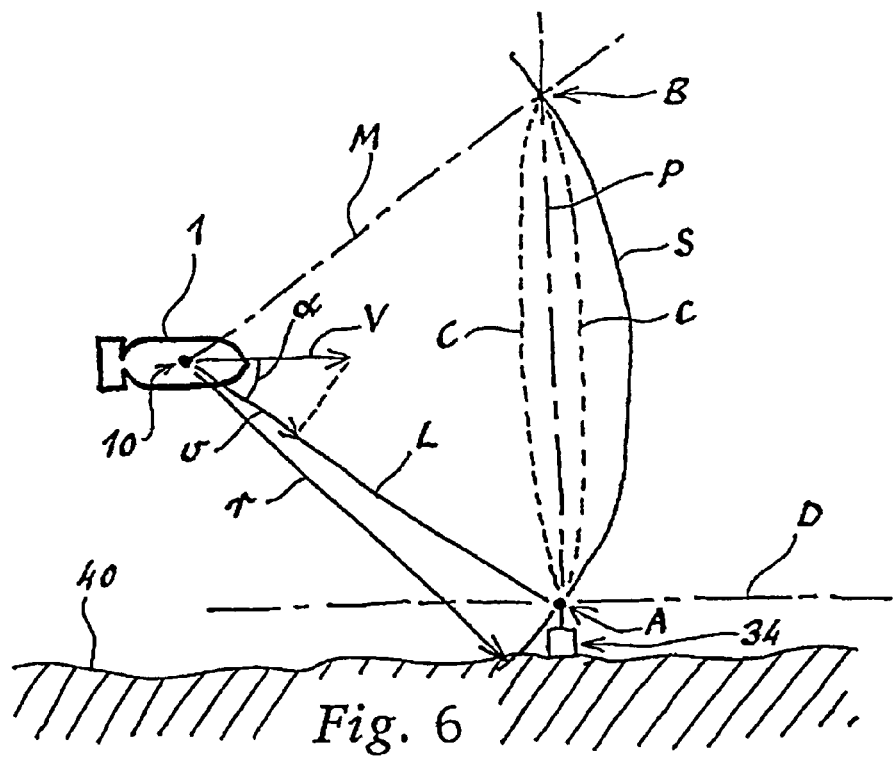
FIG. 6 shows an underwater vehicle determining its absolute position from one or two processings of acoustic signals from a single transponder, in schematic side view.

These two criteria defines a circle C (the intersection of said conical surface with said spherical surface) lying in the plane P and intersecting the plane of the paper in FIG. 6 in two points A, B. The circle C is illustrated schematically in FIG. 6.

As the depth of the transponder is known (e.g. from the initial triangulation or from telemetry data from a built-in pressure sensor), this will be located in a horizontal plane D, which intersects the mentioned circle in two points, being the possible positions of the transponder as seen from the underwater vehicle 1.

Distinguishing between the true and the false of these two points is believed to be quite easy, as the virtual, absolute position (the absolute position as estimated by means of the method of the invention) of the false point will change from one measurement to another, as the velocity vector changes. Also, once it is established which point is the true one, the absolute position of this point will be on record, and distinguishing between future true and false points will be quite easy.

Accordingly, in this embodiment of the invention, only very few, say, two or three recordings will suffice to establish the absolute position in three dimensions of the vehicle 1 (the absolute position of the transponder being known à priori in three dimensions), and future updatings of the vehicle's DR navigation system may each be made with only one or very few calls to the transponder. This will bring about considerable operational savings as well as a much increased precision of the underwater navigation.

The drawing in FIG. 6 is only schematic; of course the velocity vector V and the transponder 34 will not normally both lie in the plane of the paper, and thus the plane P will not normally be orthogonal to the plane of the paper. Also, the depth (D) of the transponder is illustrated as being coincident with the lowest point on the circle C, which will not normally be the case.

Figure 7:
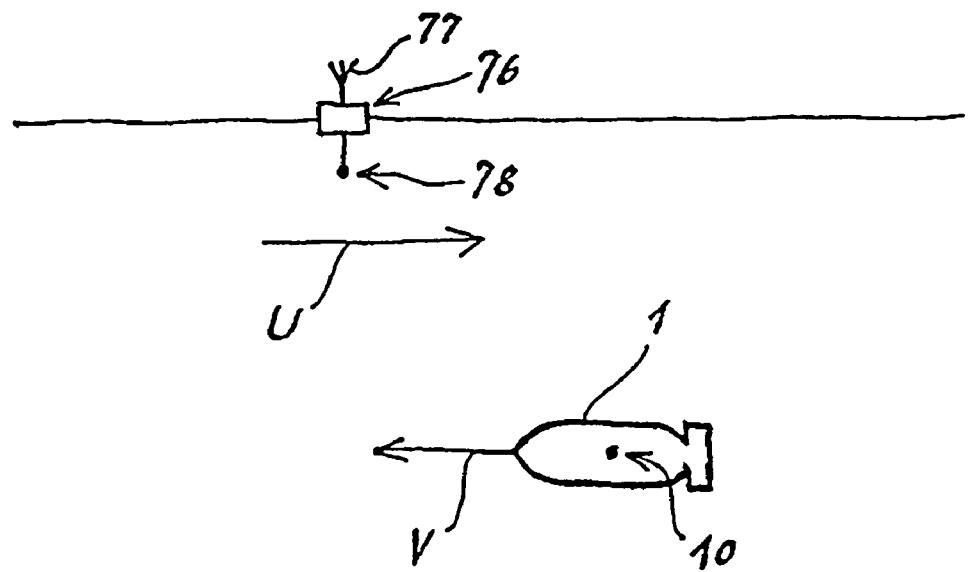
FIG. 7 shows a submersible vessel determining its absolute position from one or two processings of passively received acoustic signals from a single buoy, in schematic side view.

Another preferred embodiment of the method of the invention is illustrated in FIG. 7. Here, the reference station is a buoy 76 floating on the surface 41 of the water body and having an aerial 77 for receiving absolute position data from e.g. the GPS, and a speaker 78 for transmitting acoustic data into the water. The buoy may be anchored, it may be drifting with a velocity vector U, or its motion may be controlled by a propulsion device, according to the character of the water body and of the mission in question. The buoy may be powered by batteries; by wind or solar power, by a generator set or any combination thereof.

According to the invention, the buoy 76 continuously receives absolute position and velocity data and preferably also precise time information via the aerial 77. It transmits these data acoustically into the water through the speaker 78.

A submersible vessel 1 travels submersed with a velocity vector V; it has a hydrophone 10 and through this receives the data transmitted from the buoy. The vessel also records the doppler shift of an acoustical signal from the buoy 76 in order to obtain range rate information, preferably the doppler shift of a carrier frequency included in the signal and having a known, certain frequency. Alternatively, the vessel determines range rate by means of spread spectrum signalling technique as described in the previous embodiment example.

Further, the vessel 1 may utilise depth information provided by a depth indicator or pressure sensor on board the vessel 1.

Finally, the vessel 1 is equipped with an accurate clock, previously being synchronised with a time base of the buoy, preferably the time base used by the satellite positioning system.

According to the invention, the following information is preferably being processed in the vessel's control system or computer:

1) The absolute position and velocity of the buoy, being comprised in the received signal;
2) Distance information being derived from the difference between the time information in the received signal and the time of receival of the signal;
3) Range rate information, i.e the rate of change of distance between the vehicle 1 and the buoy 76, which is equal to the projection of (V-U) in the direction of the position of the buoy at the time of transmission, U and said position being comprised in the received signal;

4) Depth information as provided by a depth indicator in the vessel 1;
5) The vessel's absolute velocity vector as provided by the vessel's log and heading reference; and
6) The position estimate from the DR navigation system.

The mathematics required to determine two possible absolute positions of the vessel now correspond directly to those used with reference to FIG. 6, and an unambiguous position is determined nearly as easily as in that case, the motion of the buoy being known to the vessel from the contents of the acoustic signals.

This embodiment of the invention has numerous advantages. Firstly, a buoy is easier to deploy and to collect than a transponder, and in particular it does not need to be calibrated, having access to e.g. GPS data. Secondly, no signals are transmitted from the submersed vessel. This will be important to military applications, and it will as well serve to save energy on board. Thirdly, if the buoy is drifting, it will in fact be possible to determine the absolute position of a stationary, submersed vessel, utilising the method just explained.

It is not an absolute requirement of this embodiment that the buoy transmits velocity information. Instead, only range measurements may be used to calculate the absolute position of the underwater vehicle.

Further, the buoy may transmit additional motion data such as e.g. acceleration which may be utilised by the vessel to determine position. It may be noted that the buoy will be very similar to the buoys mentioned in U.S. Pat. No. 5,119,341.

Furthermore, it is not an absolute requirement that the absolute velocity vector of the vehicle is known. If only the velocity vector relative to the body of water is known, the sea current may be estimated as well, at the expense of decreased accuracy or increased number of measurements.

Figure 8:
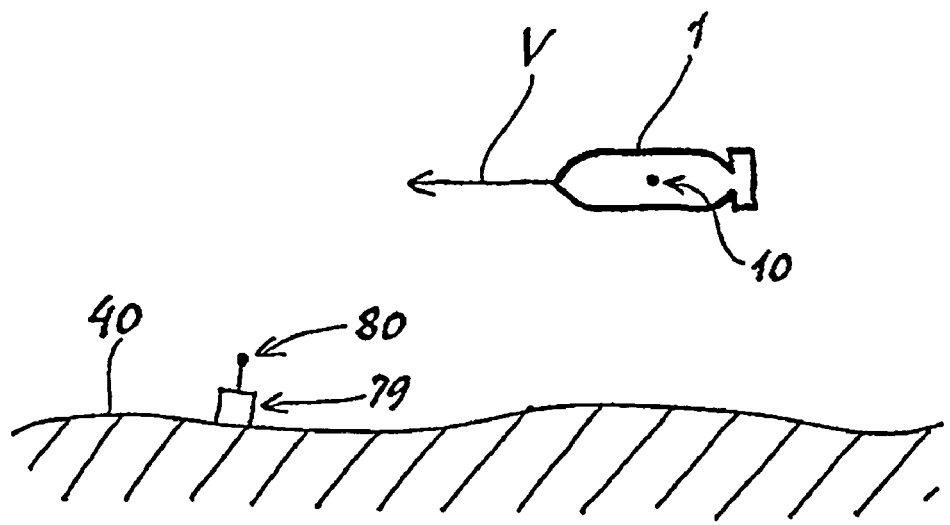
FIG. 8 shows an underwater vehicle determining its absolute position from a number of measurements on passively received acoustic signals from a single acoustic beacon or "pinger", in schematic side view.

An embodiment of the method of the invention illustrated in FIG. 8 will now be explained: A reference station in the form of a unit 79 autonomously transmitting short acoustic signals ("pings") from a speaker 80 at fixed and known intervals and frequencies, a so-called "Pinger" or acoustic beacon, is placed at or near the sea floor 40. An underwater vehicle 1 having a hydrophone 10 is navigating with a velocity vector V within audibility of the pinger.

Assuming accurate clocks are available in both the pinger and the submersible vessel, the ping reception times will constitute pseudo range measurements. As the submersible vessel travels on, more pseudo ranges are made. It is seen that the mathematical problem of determining the position of the pinger in the relative coordinate frame of the DR navigation system is equivalent to the well known GPS pseudo range problem, and may e.g. be solved by using a least-squares algorithm, a Kalman filter, or the algebraic solution given in Stephen Bancroft: "An Algebraic Solution of GPS Equations", IEEE Transactions on Aerospace and Electronic Systems, Vol AES-21 No. 7, January 1985, pp. 56–59. As described in the previous embodiment, the range rate may also be calculated and used to determine the relative position of the beacon.

Assuming that the absolute position of the pinger has been determined from the surface, the offset of the DR navigation system is now calculated by subtracting the positions of the transponder in the DR frame and the absolute frame, and hence the absolute position of the submersible vessel is determined.

As one main advantage of using a pinger is that it is much cheaper than a transponder 34 or a buoy 76 of the types mentioned, no high requirements should be made of it. Accordingly, the stabilities of its signal frequency and intervals might not be usable as basis for measurements.

Similar to the previous embodiments, unknown parameters such as e.g. interval and frequency of the beacon may to some extent be estimated as part of the process. However, estimating additional parameters will typically require additional measurements and may put some constraints on the motion pattern of the vehicle in order to provide observability.

Thus, experimental simulations have shown that provided adequate computing power is installed on board the underwater vehicle, and provided short term frequency stability of the pinger can be assumed, it will be possible to determine the vehicle's absolute position from such a low quality pinger signal.

In the extreme situation that no information is available as to the pinger's absolute position or depth, this will require rather many recordings of sets of the available variables, which comprise:

The vehicle's depth;
The vehicle's absolute velocity vector (three dimensions and magnitude), or velocity vector relative to the body of water;
Continuous displacement information from the vehicle's DR navigation system; and
Received pinger acoustical signal frequency and short term frequency deviations.

When these variables are recorded while the vehicle travels a path which is varied appropriately as to course, depth, ascend and speed, it will according to the simulations mentioned be possible to solve the mathematical problem of determining the absolute position of the vehicle 1.

Of course, any supplementary information will tend to letting the mathematical problem be solved more quickly and with less elaborate travel of the vehicle; such information could be that the pinger frequency is in fact stable, or maybe even known beforehand. Needless to say, if the absolute position of the pinger is known as well, the problem is easily solved.

In cases where a survey area is to be surveyed more than once, it will hardly be advantageous to collect the transponders after use, as described with reference to FIG. 5. In such cases, e.g. when a pipe-line is to be surveyed regularly, say, once a year, it will be preferable to let the dropped transponders stay in place, ready to be used in future missions. As the position of such transponders do not change, it is an evident advantage to be able to re-use the same transponders in future missions.

Figure 9:
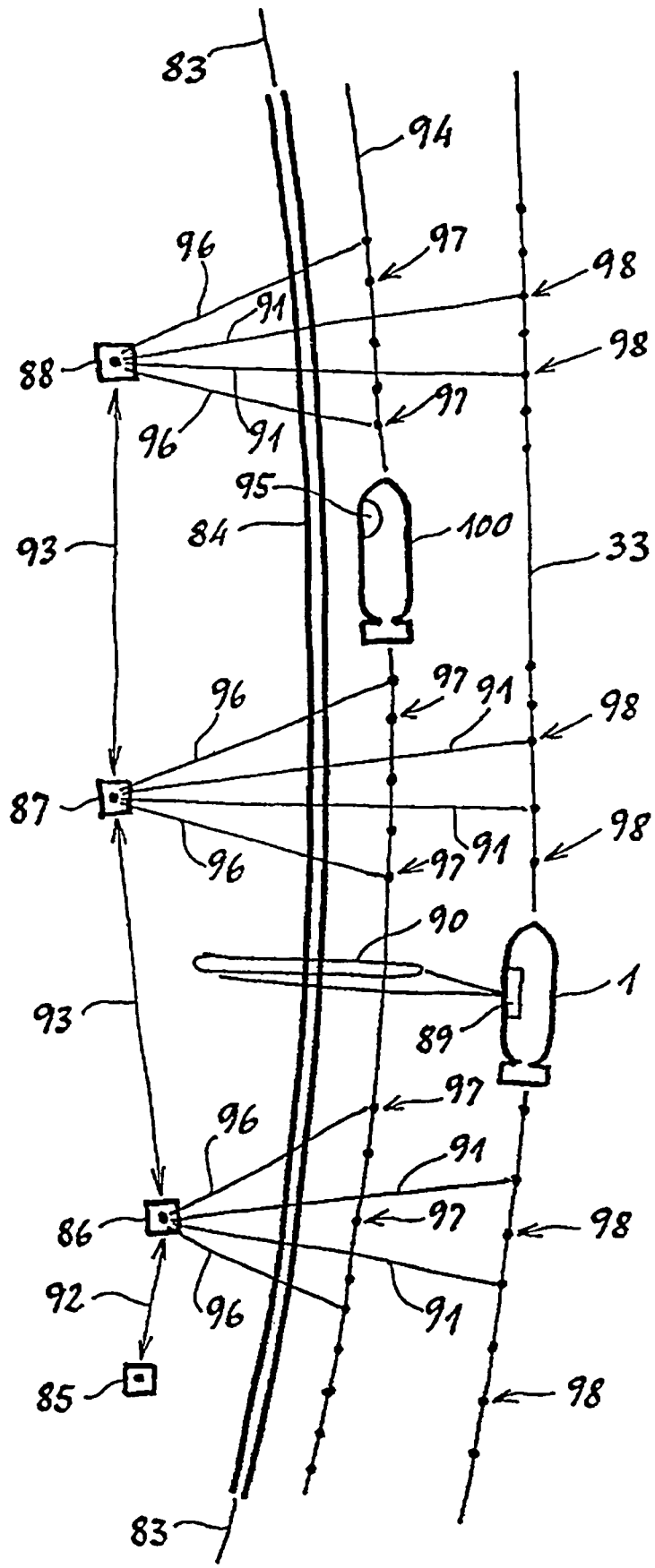
FIG. 9 shows an underwater vehicle determining the absolute position of a submersed pipe-line and later surveying the pipe-line using previously collected position data.

An example of a preferred embodiment of the method f the invention for surveying pipelines, power cables telecommunication cables or other underwater installations with an elongated configuration will now be explained with reference to FIG. 9.

The trajectory 83 of an installation 84 is known à priori to a certain accuracy, e.g. 10 m. Following the procedures previously described and using transponders 85–88, the installation 84 is initially surveyed (33) by a vehicle 1 using e.g. a side-scan or swath bathymetry sonar installation 89 which has a sufficiently large "footprint" 90 on the sea floor to ensure that the installation 84 is covered despite said uncertainty of its absolute position and the predictable navigation error of the underwater vehicle 1.

In the present embodiment of the invention, said initial survey may be carried out using pre-deployed and pre-calibrated transponders 85–88, in which case position fixes 98 are obtained via range measurements 91 whenever passing a transponder, following the procedure explained above with reference to FIG. 2, in order to update the DR navigation system.

In either case, the distances 93 between consecutive transponders 86–88 should be such that the accuracy of the real-time navigation of the vehicle 1 between the position fixes provided by means of range measurements from points 98 in the initial survey and in subsequent surveys is sufficient for the survey sensor 89, e.g. a side-scan sonar to sense the installation 84, and could be e.g. 10 km if a very high accuracy DR navigation system is being used. Post-processing of the position data as described above will provide an excellent estimation of the actual trajectory 33 of the underwater vehicle 1 during the initial survey.

The absolute trajectory 83 of the installation 84 will now be determined from analysing the sonar imagery obtained of the installation 84 during said initial survey. The transponders 85–88 remain on the sea floor for use in subsequent surveys of the installation.

In subsequent surveys, an underwater vehicle 100 is commanded to follow a trajectory 94 which is calculated from the previously determined trajectory 33 to more closely follow the installation 84, and hence allow close-range survey sensors 95, such as e.g. a video camera, an acoustic camera, a swath bathymetry sonar or a laser scanner (range finder), to sense the installation 84 from a shorter range.

Position fixes are obtained via range measurements 96 from points 97 whenever the underwater vehicle 1 passes within the acoustic range of a transponder 85–88. Since the trajectories 33, 94 may be almost straight lines, a position fix will be ambiguous as to lying to the port or starboard side of the transponder (as seen in the direction of travel of the vehicle 1, 100). However, this ambiguity is easily solved using prior knowledge of the locations of the transponders 86–88.

Following the survey trajectory 94 with the required accuracy, e.g. 1–2 m, is a very challenging task even for a very high grade DR navigation system. However, since the position error of such high grade DR navigation systems is almost a linear function, i.e. very systematic, of time and distance, especially in the case of an almost linear trajectory, it will be possible to update said DR navigation system after position fixes has been obtained from two transponders 85, 86 with known absolute positions.

This updating will typically provide a tenfold improvement in heading accuracy allowing extended distances, e.g. 10 km to be navigated between position fixes with the required accuracy, e.g. 1–2 m. It may be advantageous to deploy two transponders 85, 86 with a reduced interval 92 at the beginning of the survey to allow a first updating to be performed without having to travel the full distance 93 between transponders 86–88. In addition, an initial path of the type 32 (FIGS. 3, 5) may be travelled by the vessel as needed.

According to a further embodiment of the invention, it will be possible to navigate for extended periods of time and over extended areas or distances by means of at least two co-operating submersible vessels. This will permit autonomous survey of a very large area or a very long line without the need for reference transponders or a survey ship.

In this embodiment, each of the co-operating submersible vessels have aerial means and a suitable receiver for receiving absolute position data from a positioning system such as GPS. Each submersible vessel also have a speaker for transmitting acoustic data into the water.

At regular intervals one of the submersible vessels ascends to the surface from where it transmits position, velocity and time data into the water by means of its speaker, in the same way as explained for the buoy 76 (FIG. 7). These data are received by the other, submersed vessel as described with reference to FIG. 7, and used to update the DR system of that vessel.

Each of the submersible vessels may further be equipped with generator means capable of recharging the vessel's batteries as long as the vessel is surfaced. Thus accurate absolute navigation over very extended ranges, even e.g. a transatlantic survey, can be achieved. Also, the vehicles may communicate with a ground station or an operator via satellite or surface radio communication means while surfaced.

Even if in the preceding description and the attached claims, reference is being made to navigation under the surface of the sea, nothing will prevent the invention from being used in other media where the signals of the generally used, radio based navigation systems do not propagate effectively.

Even if in the preceding description and the attached claims, reference is only being made to the use of the invention in a submersible vessel, nothing will prevent the invention from being of use in other types of submersible units, the positions of which are to be determined.

The invention claimed is:

1. A method for determining the absolute position under water of a submersible vessel having a dead reckoning navigation system not receiving position information from outside the vessel, where the vessel receives acoustic signals from a reference station having a known absolute position and calculates its range from the reference station, wherein said acoustic signals are received from the same reference station in several arbitrary positions of the vessel, and that estimated absolute positions of the vessel are calculated using sets of data, each set of data comprising said calculated range and navigation data from the dead reckoning navigation system, said navigation data being valid concurrently with said calculated range.

2. A method according to claim 1, wherein data from each received signal are processed immediately or shortly after reception, providing for a substantially continuous estimation of absolute position.

3. A method according to claim 1, wherein the position of the reference station in a relative coordinate frame of said dead reckoning navigation system is estimated.

4. A method according to claim 1, wherein the estimated absolute position data are used for updating the dead reckoning system's relative position data.

5. A method according to claim 1, wherein estimates are made of parameters intrinsic to the nature of the dead reckoning navigation system and relative position data from the dead reckoning navigation system are compensated by the estimate of said parameters.

6. A method according to claim 5, wherein a least squares algorithm is used to estimate absolute position and parameters intrinsic to the nature of the dead reckoning navigation system.

7. A method according to claim 5, wherein a Kalman filter is used to estimate absolute position and parameters intrinsic to the nature of the dead reckoning navigation system.

8. A method according to claim 1, wherein said estimates are made further utilizing information on the depth of the reference station.

9. A method according to claim 1, wherein the reference station is placed at a fixed absolute position.

10. A method according to claim 9, wherein the absolute position of the reference station is determined by the submersible vessel at the surface of the water collecting absolute position data in a number of positions from a positioning system usable at the surface of the water, and while surfaced receiving acoustic signals from the reference station, and calculating range data from said signals, position and range data preferably being processed on board the vessel.

11. A method according to claim 1, wherein the reference station is launched from the submersible vessel.

12. A method according to claim 1, wherein the reference station is collected by the submersible vessel after estimating an absolute position.

13. A method according to claim 1, wherein the reference station comprises an acoustic transponder.

14. A method according to claim 1, wherein the reference station comprises an acoustic beacon.

15. A method according to claim 1, wherein the reference station is placed on the surface of the water, preferably in a buoy or a vessel.

16. A method according to claim 15, wherein the reference station receives absolute position data from a positioning system usable at the surface of the water, and relays such data to the submersible vessel.

17. A method according to claim 15, wherein the reference station exchanges communication data with a communication system usable at the surface of the water, and preferably as well exchanges such data with the submersible vessel.

18. A method according to claim 15, wherein the reference station is placed in a submersible vessel being surfaced during use of the reference station.

19. A system for determining the absolute position under water of a submersible vessel by means of the method in claim 1, the system comprising:
  a reference station having acoustic communication means;
  acoustic communication means on board the vessel;
  a dead reckoning navigation system on board the vessel;
  wherein the system comprises computing means, preferably on board the vessel, adapted to estimating absolute position data from consecutive receptions of signals from one and the same reference station, together with relative position data from the dead reckoning navigation system.

20. A system according to claim 19, wherein the dead reckoning system comprises an Inertial Navigation System.

21. A system according to claim 19, wherein the dead reckoning system comprises:
  a number of gyros;
  a number of accelerometers;
  a Doppler Ground Velocity Log;
  a direct or indirect speed of sound measurement sensor; and
  a pressure sensor.

22. A system according to claim 19, wherein the submersible vessel is adapted to carry a number of reference stations and to launch the stations independently.

23. A system according to claim 19, wherein the submersible vessel is adapted to collect a number of reference stations.

24. A system according to claim 19, wherein the reference stations are acoustic transponders or beacons, resting on the sea floor or suspended above an anchor resting at the sea floor.

25. A system according to claim 19, wherein the reference stations are located on buoys or vessels floating at the surface of the water.

26. A method for determining the absolute position under water of a submersible vessel having a dead reckoning navigation system not receiving position information from outside the vessel, where the vessel receives acoustic signals from a reference station having a known absolute position and calculates its range from the reference station, wherein said acoustic signals are received from one reference station in one or more positions of the vessel; wherein data for rate of change of the vessel's range from the reference station ("range rate data") are derived from said acoustic signals; and wherein estimated absolute positions of the vessel are calculated using said calculated range, said range rate data, and navigation data from the dead reckoning navigation system.

27. A method according to claim 26, wherein said range rate data are derived from recordings of Doppler shifts in frequencies of said acoustic signals.

28. A method according to claim 26, wherein said range rate data are derived from recordings of time discrepancies in the arrival times of spread spectrum pulses embedded within said acoustic signals.

29. A method according to claim 26, wherein data from each received signal are processed immediately or shortly after reception, providing for a substantially continuous estimation of absolute position.

30. A method according to claim 26, wherein the position of the reference station in a relative coordinate frame of said dead reckoning navigation system is estimated.

31. A method according to claim 26, wherein the estimated absolute position data are used for updating the dead reckoning system's relative position data.

32. A method according to claim 26, wherein estimates are made of parameters intrinsic to the nature of the dead reckoning navigation system and relative position data from the dead reckoning navigation system are compensated by the estimate of said parameters.

33. A method according to claim 32, wherein a least squares algorithm is used to estimate absolute position and parameters intrinsic to the nature of the dead reckoning navigation system.

34. A method according to claim 32, wherein a Kalman filter is used to estimate absolute position and parameters intrinsic to the nature of the dead reckoning navigation system.

35. A method according to claim 26, wherein said estimates are made further utilizing information on the depth of the reference station.

36. A method according to claim 26, wherein the reference station is placed at a fixed absolute position.

37. A method according to claim 36, wherein the absolute position of the reference station is determined by the submersible vessel at the surface of the water collecting absolute position data in a number of positions from a positioning system usable at the surface of the water, and while surfaced receiving acoustic signals from the reference station, and calculating range data from said signals, position and range data preferably being processed on board the vessel.

38. A method according to claim 26, wherein the reference station is launched from the submersible vessel.

39. A method according to claim 26, wherein the reference station is collected by the submersible vessel after estimating an absolute position.

40. A method according to claim 26, wherein the reference station comprises an acoustic transponder.

41. A method according to claim 26, wherein the reference station comprises an acoustic beacon.

42. A method according to claim 26, wherein the reference station is placed on the surface of the water, preferably in a buoy or a vessel.

43. A method according to claim 42, wherein the reference station receives absolute position data from a positioning system usable at the surface of the water, and relays such data to the submersible vessel.

44. A method according to claim 42, wherein the reference station exchanges communication data with a communication system usable at the surface of the water, and preferably as well exchanges such data with the submersible vessel.

45. A method according to any of claim 42, wherein the reference station is placed in a submersible vessel being surfaced during use of the reference station.

46. A system for determining the absolute position under water of a submersible vessel by means of the method in claim 26, the system comprising:
 a reference station having acoustic communication means;
 acoustic communication means on board the vessel;
 a dead reckoning navigation system on board the vessel;
 wherein the system further comprises computing means, preferably on board the vessel, adapted to estimating absolute position data from one or more receptions of signals from one and the same reference station, together with relative position data from the dead reckoning navigation system.

47. A system according to claim 46, wherein the dead reckoning system comprises an Inertial Navigation System.

48. A system according to the claim 46, wherein the dead reckoning system comprises:
 a number of gyros;
 a number of accelerometers;
 a Doppler Ground Velocity Log;
 a direct or indirect speed of sound measurement sensor; and
 a pressure sensor.

49. A system according to claim 46, wherein the submersible vessel is adapted to carry a number of reference stations and to launch the stations independently.

50. A system according to claim 46, wherein the submersible vessel is adapted to collect a number of reference stations.

51. A system according to claim 46, wherein the reference stations are acoustic transponders or beacons, resting on the sea floor or suspended above an anchor resting at the sea floor.

52. A system according to claim 46, wherein the reference stations are located on buoys or vessels floating at the surface of the water.

53. A method for scanning an underwater survey area by means of a submersible vessel traveling a desired path, the vessel having a dead reckoning navigation system not receiving position information from outside the vessel, where the vessel receives acoustic signals from a reference station having a known absolute position and calculates its range from the reference station, wherein the absolute position of the vessel is intermittently being determined.

54. A method according to claim 53, wherein said area extends beyond the operational reach of said reference station, and the intended trajectory of the vessel is arranged to bring the vessel within said operational reach at regular intervals of time.

55. A method according to claim 53, wherein the intended trajectory of the vessel is arranged to bring the vessel within a minimum distance of every point in said area.

56. A method according to claim 12, wherein said reference station is placed at a fixed absolute position.

57. A method according to claim 53, wherein the absolute position of said reference station is determined by said submersible vessel at the surface of the water collecting absolute position data in a number of positions from a positioning system usable at the surface of the water, and while surfaced receiving acoustic signals from said reference station, and calculating range data from said signals, position and range data preferably being processed on board said vessel.

58. A method according to claim 53, wherein said reference station is launched from said submersible vessel.

59. A method according to claim 53, wherein said reference station is collected by said submersible vessel after estimating an absolute position.

60. A method according to claim 53, wherein said reference station comprises an acoustic transponder.

61. A method according to claim 53, wherein said reference station comprises an acoustic beacon.

62. A method according to claim 53, wherein said reference station is placed on the surface of the water, preferably in a buoy or a vessel.

63. A method according to claim 62, wherein said reference station receives absolute position data from a positioning system usable at the surface of the water, and relays such data to said submersible vessel.

64. A method according to claim 62, wherein said reference station exchanges communication data with a communication system usable at the surface of the water, and preferably as well exchanges such data with said submersible vessel.

65. A method according to claim 62, wherein said reference station is placed in a submersible vessel being surfaced during use of the reference station.

* * * * *